June 3, 1924.
A. L. KNAPP
MOTOR VEHICLE
Filed Sept. 13, 1920
1,496,375
2 Sheets-Sheet 1
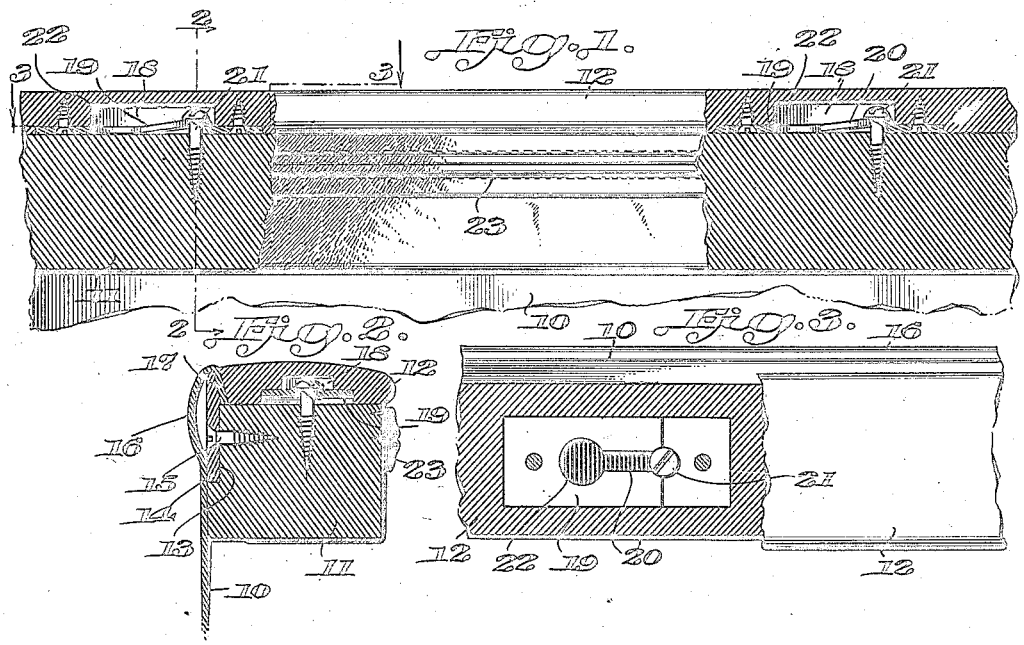
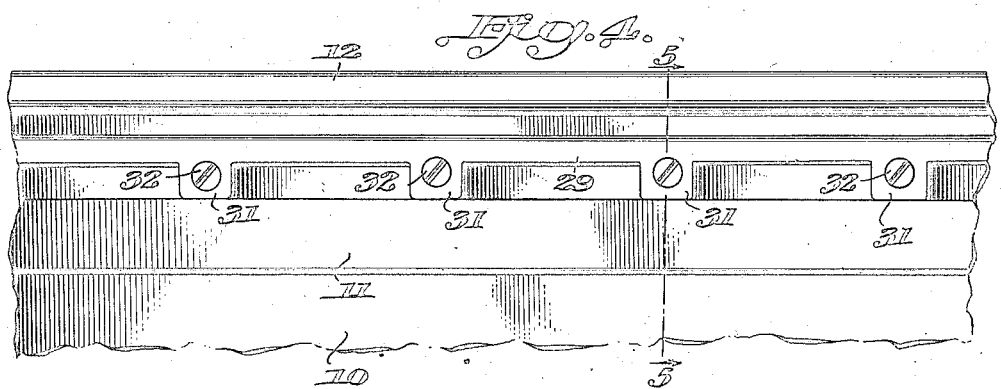
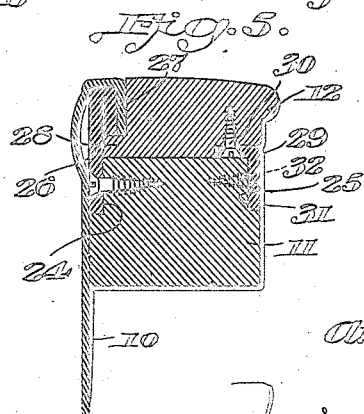
Inventor
Archer L. Knapp,
By William J. Phetts
Attorney

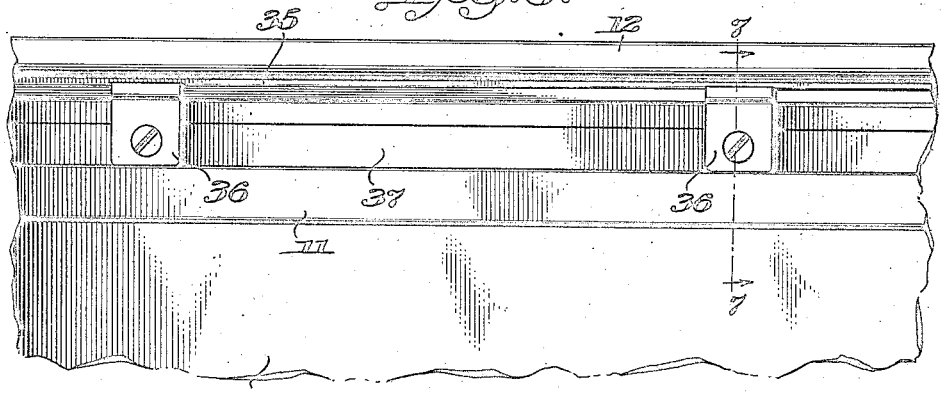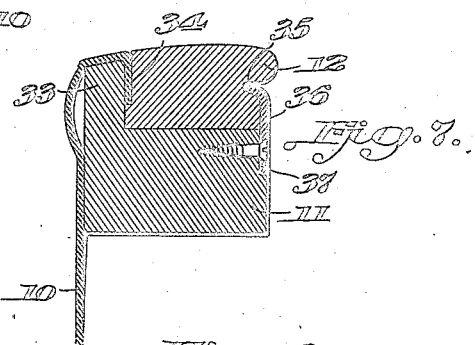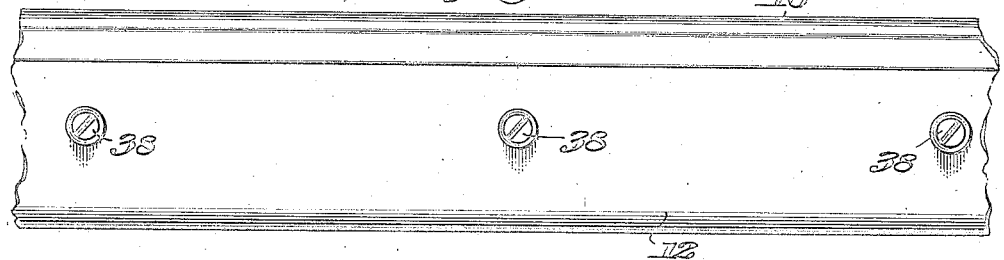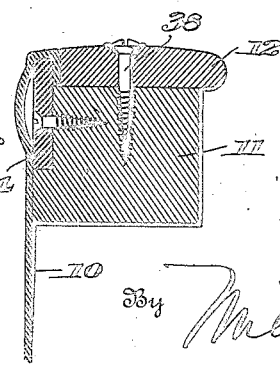

Patented June 3, 1924.

1,496,375

UNITED STATES PATENT OFFICE.

ARCHER L. KNAPP, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed September 13, 1920. Serial No. 410,041.

*To all whom it may concern:*

Be it known that I, ARCHER L. KNAPP, a citizen of the United States, and resident of Detroit, Wayne County, State of Michigan, have invented certain new and useful Improvements in Motor Vehicles, of which the following is a specification.

This invention relates to motor vehicles, and more particularly to the body construction and body finish of such vehicles.

One of the objects of the invention is to provide an improved top edge finish for the side panels or door panels of a motor vehicle body.

Another object of the invention is to secure the top or finish molding strip and top rail to the side panel of a motor vehicle body in such a manner that rain and dirt cannot easily injure the finish.

Another object of the invention is to provide concealed fastening means for securing the top rail and molding strip to the panel of a vehicle body.

Further objects of the invention will appear from the following specification taken in connection with the drawings which form a part of this application, and in which—

Figure 1 is a view in side elevation partly broken away illustrating one form of my invention;

Figure 2 is a vertical sectional view taken substantially on line 2—2 of Figure 1;

Figure 3 is a sectional view taken on line 3—3 of Figure 1;

Figure 4 is a side elevation of a portion of the motor vehicle body illustrating another embodiment of the invention;

Figure 5 is a sectional view taken on line 5—5 of Figure 4;

Figure 6 is a side elevation view illustrating another embodiment of the invention;

Figure 7 is a sectional view taken on line 7—7 of Figure 6;

Figure 8 is a top plan view of another form of the invention; and

Figure 9 is a vertical sectional view of the construction shown in Figure 8.

In the embodiment of the invention shown in Figures 1 to 3 inclusive, a side panel of the body of the motor vehicle is indicated at 10, the top rail 11 and top or finish molding strip 12 being connected to the panel 10 in the following manner:

As shown in Figure 2, one side surface of the rail 11 is recessed as indicated at 13 and a bar or strip of metal 14 is secured in this recess by means such as the screws 15 which extend into the rail 11. The outer surface of the strip 14 is flush with the main portion of the outer surface of the rail 11 and the strip 14 extends upwardly above the top surface of the rail. The panel 10 of the body extends upwardly over the upper edge of the strip 14 and is bent back upon itself, as shown in Figure 2, so that its free edge rests against one edge of the strip 14. A beading 16 is formed in the panel to give the proper finish to the body.

One edge of the molding strip 12 is inclined, as shown at 17, to conform to the inclination of the free end of the panel 10 and also to the inclination of the inner portion of the extended part of the strip 14. The means for securing the molding strip 12 to the rail 11 is preferably concealed from view when these members are connected together and in the embodiment illustrated in Figures 1 to 3 this means comprises coacting members secured respectively to the rail and to the under-surface of the molding strip. The under-surface of the molding strip is recessed, as shown in Figures 1 and 2, at 18 and a plate 19 is secured over each of these recesses and is provided with a keyhole slot 20. Screws 21 are threaded into the upper portion of the top rail 11 and extend above the upper surface thereof, and these screws are adapted to enter the enlarged portions 22 of the keyhole slots when the molding strip 12 is to be secured to the rail 11. These members are fastened together by simply super-imposing the strip 12 on the rail 11 in such a position that the screws will enter the portions 22 of the slots 20 and then moving the strip 12 longitudinally to the position illustrated in Figures 1 to 3 inclusive.

The rail 11 may be provided, as shown in Figures 1 and 2, with a finish 23 formed of leather or any other suitable material and covering the exposed part of the rail.

In the embodiment of the invention illustrated in Figures 4 and 5, the body panel, top rail and molding strip are indicated respectively by the same reference characters as those used in Figures 1 to 3, namely 10, 11 and 12. In this form of the invention the rail 11 is recessed on both of its side faces, as indicated at 24 and 25, and a strip or bar 26 is secured in the recess 24 in a manner similar to the strip 14 shown in Figure 2. The upper end of the strip 26 is, however, bent over upon itself and the upper edge of the body panel 10 is bent around into engagement with the inner edge of this bent-over portion of the strip 26. It should also be noted that the rail 12 is cut away at one side, as shown at 27, thereby providing an outwardly projecting portion 28 which is positioned beneath the free ends of the strip 26 and panel 10.

The molding strip 12 is secured to the rail 11 by means of a metallic strip 29 which is secured to the molding strip 12 by means such as screws 30 and is provided with a plurality of downwardly extending lips 31 which are adapted to be positioned in a recessed or grooved portion 25 of the rail 11 and to be secured to the rail by means of screws 32.

It will be understood that the strip 29 is secured to the molding strip 12 before the strip 12 is positioned on the top rail 11 and the parts are assembled in the following manner:

The body panel 10 is first positioned over the upwardly extending portion of the strip 26 and then the strip 12 is super-imposed on the rail 11 and is secured thereon by means of screws 32. It will also be understood that a finishing member similar to the finish 23 shown in Figure 2 may be thereafter secured to the rail 11 in order to conceal the lips 31 and the screws 32.

I have illustrated in Figures 6 and 7 a top rail 11 having an integrally formed upwardly extending portion 33 over which the panel 10 extends and a molding strip 12 having a recess 34 on one edge to receive the free end of the strip 10 and a longitudinally extending groove 35 on its opposite edge. The strip 12 is secured to the rail 11 by a plurality of clamping members 36, the upper ends of which enter the groove 35 and the lower portions of which are secured in a recessed or grooved portion 37 of the rail 11. The members 36 may be concealed by suitable finishing material, as in the form of the invention shown in Figure 2.

In the embodiment of the invention shown in Figures 8 and 9, the panel 10, rail 11, molding strip 12, and strip or bar 14 are practically identical with those shown in Figures 1 and 2, and this form of the invention differs from that shown in Figures 1 and 2 merely in having a plurality of screws 38 for securing the strip 12 to the rail 11, instead of the concealed fastening means shown in Figures 1 to 3.

Although I have in the above specification described several specific embodiments of the invention, it should be understood that the invention is capable of further modification and that further changes in the construction and arrangement of the cooperating parts may be made without departing from the spirit or scope of the invention as expressed in the following claims.

Having thus described my invention, what I claim and desire to secure by Letters Patent is:

1. In combination, a rail, a strip secured to one surface thereof and extending upwardly beyond the top surface thereof, a body panel extending on two sides of said strip, and a molding strip engaging the free end of said panel and secured to said rail.

2. In combination, a rail, a strip secured to one surface thereof and extending upwardly beyond the top surface thereof, a body panel extending on two sides of said strip, and a molding strip engaging the free end of said panel and secured to said rail, the upper surfaces of said panel and molding strip being substantially flush with each other.

3. In combination, a rail having a recessed portion, a strip secured in said recessed portion and extending upwardly beyond the top surface of said rail, a body panel having its upper end bent over said strip, and a molding strip secured to the upper surface of said rail and engaging the free end of said panel.

4. In combination, a rail, a strip secured to said rail and extending upwardly therefrom, a body panel extending around the upper edge of said strip, a molding strip having a portion extending beneath the free end of said panel, and means for securing said molding strip to said rail.

5. In combination, a rail having a recessed portion on two opposite sides thereof, a strip secured in one of said recessed portions and extending upwardly beyond the top surface of said rail, a body panel extending around said strip, a molding strip superimposed on said rail and having its upper surface substantially flush with the upper surface of said panel, and means extending into the recess on the opposite side of said rail and secured to said rail and said molding strip for securing the molding strip to the rail.

6. In combination, a rail having an upwardly extending portion, a body panel having a portion extending around the upwardly extending portion of said rail, a molding strip having its upper surface substantially flush with the upper surface of said panel and having a longitudinal groove along one edge thereof, and means secured to said rail and extending into said groove for securing the molding strip to the rail.

In testimony whereof I affix my signature.

ARCHER L. KNAPP.